(12) United States Patent
Kunzmann et al.

(10) Patent No.: US 10,746,321 B2
(45) Date of Patent: Aug. 18, 2020

(54) VALVE HAVING A BYPASS CONDUIT

(71) Applicant: Siemens Schweiz AG, Zürich (CH)

(72) Inventors: Rolf Kunzmann, Gernsbach (DE); Martin Wetzel, Rastatt (DE)

(73) Assignee: SIEMENS SCHWEIZ AG, Zurich (CH)

( * ) Notice: Subject to any disclaimer, the term of this patent is extended or adjusted under 35 U.S.C. 154(b) by 0 days.

(21) Appl. No.: 16/248,326

(22) Filed: Jan. 15, 2019

(65) Prior Publication Data

US 2019/0226591 A1  Jul. 25, 2019

(30) Foreign Application Priority Data

Jan. 19, 2018 (EP) ..................................... 18152475
Oct. 30, 2018 (EP) ..................................... 18203247

(51) Int. Cl.
*F16K 47/04* (2006.01)
*F16K 5/04* (2006.01)
(Continued)

(52) U.S. Cl.
CPC .......... *F16K 47/045* (2013.01); *F16K 5/0407* (2013.01); *F16K 5/0605* (2013.01); *F16K 27/065* (2013.01); *F16K 27/067* (2013.01)

(58) Field of Classification Search
CPC ......... F16K 11/08; F16K 11/083–0836; F16K 11/05–0856; F16K 11/087–0873;
(Continued)

(56) References Cited

U.S. PATENT DOCUMENTS 911,811 A * 2/1909 Dunning .............. F16K 11/0853
                                                                137/625.47
1,077,697 A * 11/1913 Gates .................. F16K 11/0853
                                                                137/625.47
(Continued)

FOREIGN PATENT DOCUMENTS

EP      1970650 A2 *  9/2008  ............... F16K 5/10
GB       720529 A     12/1954  ............... F16K 5/04
(Continued)

OTHER PUBLICATIONS

Machine Translation of EP1970650A2 (Year: 2008).*
Extended European Search Report, Application No. 18 20 3247.4, 5 pages, dated Feb. 21, 2019.

*Primary Examiner* — Michael R Reid
(74) *Attorney, Agent, or Firm* — Slayden Grubert Beard PLLC

(57) ABSTRACT

A valve may include: a valve body; a valve member in the body, movable between closed and open, comprising a first orifice, a second orifice, a main conduit between them, and a bypass in fluid communication with the main conduit. The bypass includes a first portion with a first cross-section area and a second portion with a second cross-section area different from the first cross-section area. The valve body comprises a compensation chamber having a compensation orifice. The bypass comprises an outer bypass orifice defined by and disposed on the outer surface of the valve member. The valve member comprises an internal orifice situated between the bypass and the main conduit. In the closed position, the inlet is in fluid communication with the compensation chamber via the outer bypass orifice, the bypass, the internal orifice of the valve member, the main conduit, the first orifice, and the compensation orifice.

12 Claims, 3 Drawing Sheets

(51) Int. Cl.
*F16K 5/06* (2006.01)
*F16K 27/06* (2006.01)

(58) Field of Classification Search
CPC ...... F16K 47/045; F16K 39/045; F16K 39/06;
Y10T 137/86863; Y10T 137/86871
USPC ........................................ 137/625.46, 625.47
See application file for complete search history.

(56) References Cited

U.S. PATENT DOCUMENTS

| | | | | |
|---|---|---|---|---|
| 3,108,614 | A * | 10/1963 | Navara | ..................... B05B 7/20 |
| | | | | 137/625.16 |
| 5,443,453 | A * | 8/1995 | Walker | ................ A61M 39/223 |
| | | | | 137/625.41 |
| 8,701,712 | B2 * | 4/2014 | Denney | ................... F16L 55/05 |
| | | | | 138/30 |
| 2016/0146357 | A1 | 5/2016 | Hiss et al. | ............... 251/315.01 |

FOREIGN PATENT DOCUMENTS

| WO | 2015/173071 A1 | 11/2015 | ............ F16K 11/087 |
|---|---|---|---|
| WO | 2016/162848 A1 | 10/2016 | ............ F16K 11/087 |

* cited by examiner

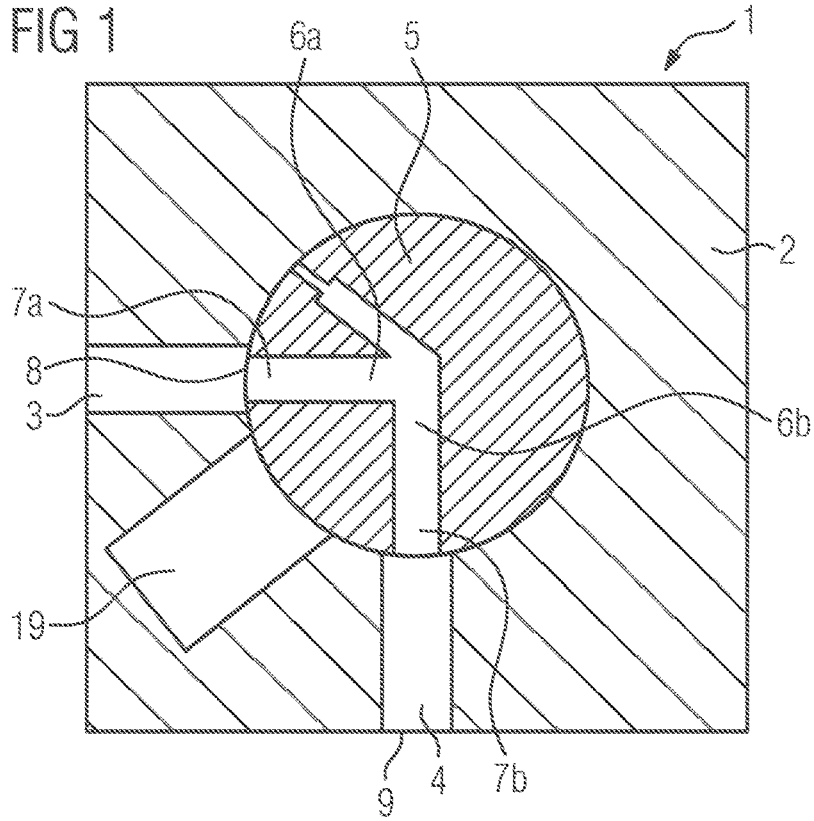
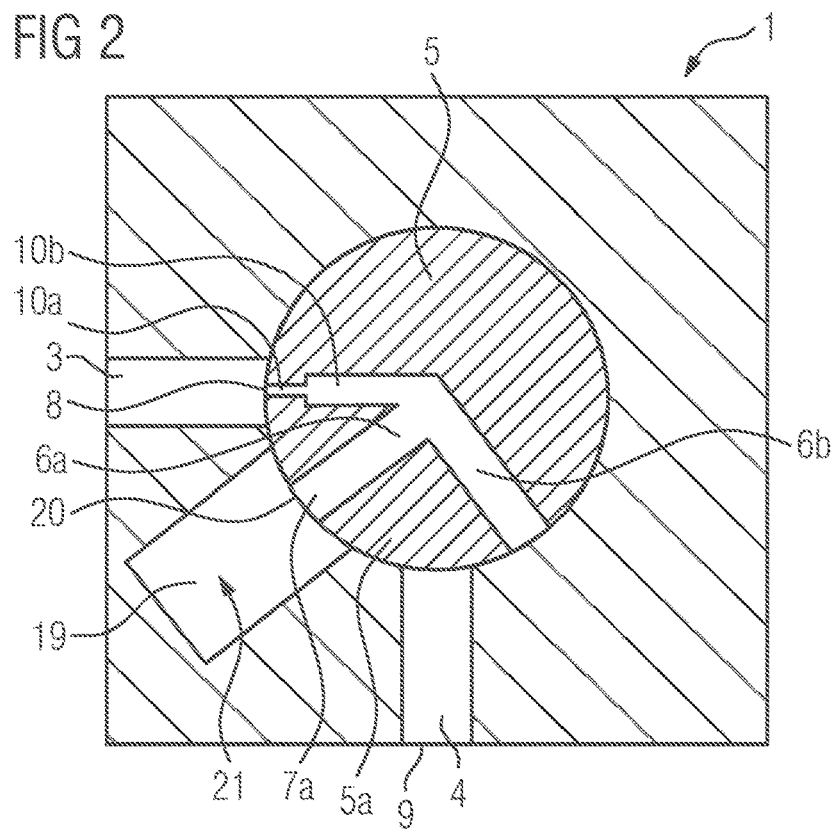

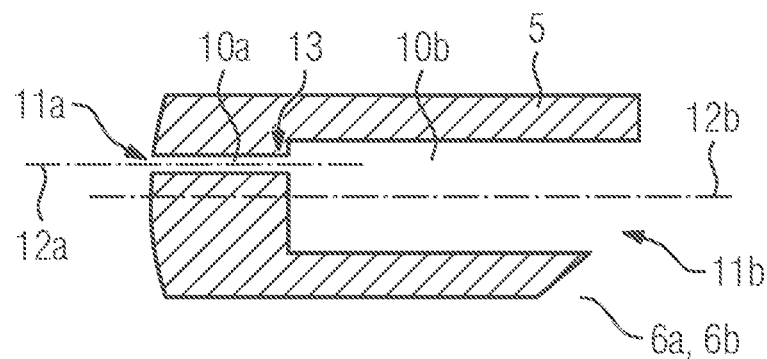
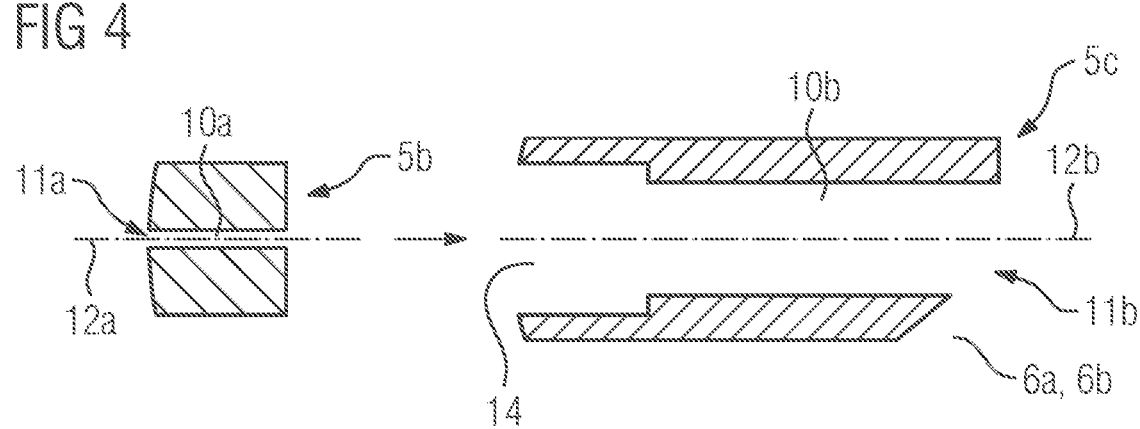

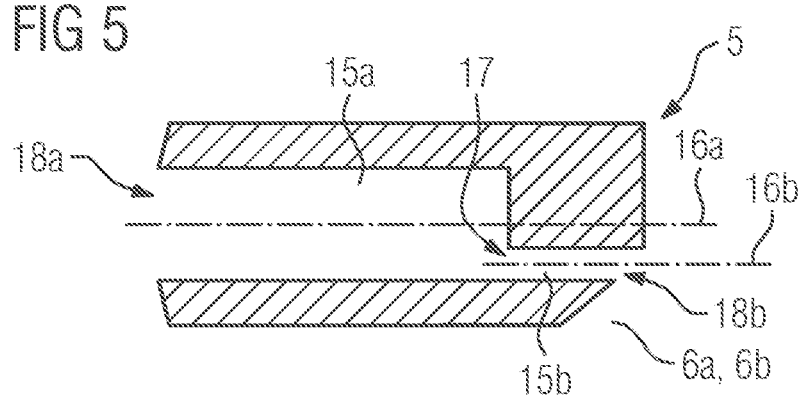
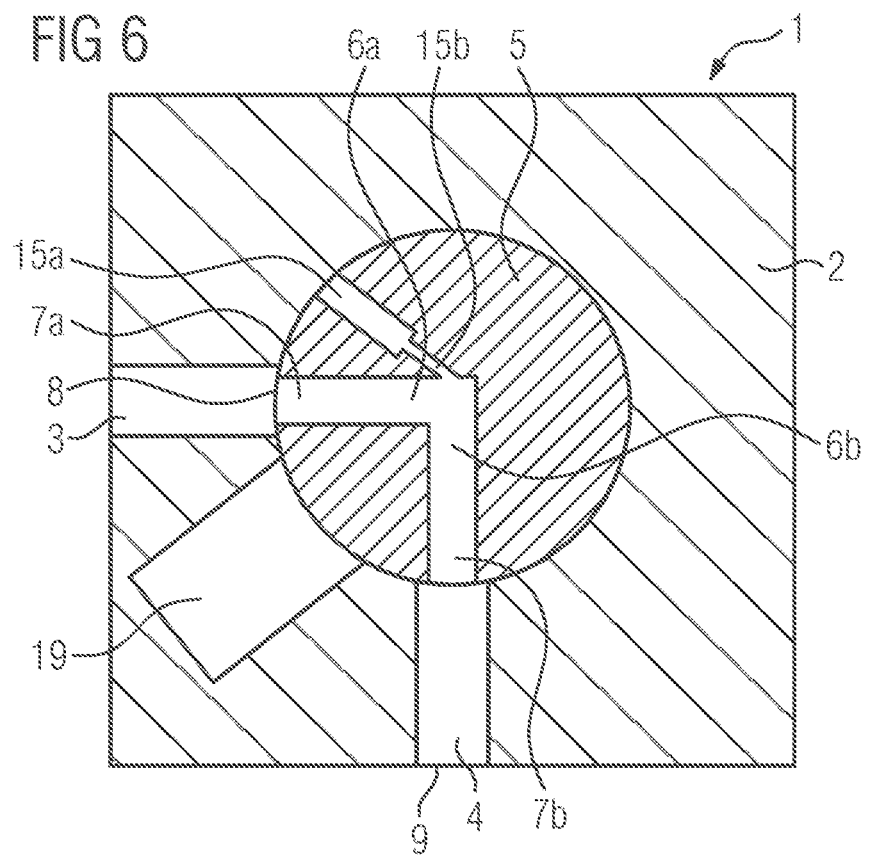

VALVE HAVING A BYPASS CONDUIT

CROSS-REFERENCE TO RELATED APPLICATIONS

This application claims priority to EP Application No. 18152475.2 filed Jan. 19, 2018 and EP Application No. 18203247.4 filed Oct. 30, 2018, the contents of which are hereby incorporated by reference in their entirety.

TECHNICAL FIELD

The present disclosure relates to valves. Various embodiments may include a valve and/or a method to control pressure in a valve that is part of a multi-way valve. Some embodiments of the teachings of the present disclosure may include a valve with a bypass conduit for pressure control purposes.

BACKGROUND

A multi-way valve such as a six-way valve is commonly employed in plumbing circuits for heating, air-conditioning, and/or ventilation. A multi-way valve may, in particular, control the flow of fluid through a chilled beam and/or through a radiant ceiling. The multi-way valve then controls flow of a fluid such as water or a blend thereof through the circuit. Six-way valves form a subgroup of multi-way valves. They are made up of two three-way valve arranged in series. Three-way valves are frequently ball valves with L-shaped conduits through their valve members. Fluid flow between the inlet and the outlet of these valves is controlled by positioning the L-shaped conduits.

A patent application WO2015/173071A1 describes a six-way valve and a heating, ventilation, and/or air-conditioning system comprising such a six-way valve. The six-way valve 20 is made up of two three-way valves 20a, 20b arranged in series. The three-way valves 20a, 20b each have valve members 22, 22' which can be selectively positioned in an open position or in a closed position. A groove 28 on the surface of one of the valve members 22, 22' is interposed between two apertures of that valve member 22, 22'. Due to the groove 28, the two apertures of that valve member 22, 22' remain in fluid communication even when the valve is in its closed position. The groove 28 allows a fluid to escape from inside the six-way valve even though the valve is in its closed position. WO2015/173071A1 states that with such a six-way valve a risk of mechanical failure and/or of wear due to temperature-induced changes in fluid pressure is reduced.

Patent application WO2016/162848A1 describes a multi-way valve with a bypass circuit. The multi-way valve of WO2016/162848A1 comprises a valve 101 with a bypass duct 110. In a first position, a fluid may flow through the valve 101 between a source port 1011 and a user port 1013. In a second position, fluid flow through the valve between the source port 1011 and a user port 1013 is obturated. The bypass duct 110 of valve 101 is arranged such that source port 1011 is fluid communication with user port 1013 also when the valve 101 is in its closed position. The bypass duct 110 of valve 101 allows a fluid to escape from inside the multi-way valve in the event of pressure changes. Pressure changes in the multi-way valve may, for instance, be induced by changes in temperature of the fluid. WO2016/162848A1 states that the multi-way valve disclosed in this reference mitigates the risk of mechanical failure and/or wear caused by changes in fluid temperature.

Patent specification GB720529A discloses a valve with a bypass conduit 9, 12. The valve in its closed position is shown on FIG. 1. In this position, the outer orifice 9 of the bypass conduit 9, 12 does not point toward a compensation chamber. Instead, the outer orifice 9 points toward a shutter surface of the valve chamber 1. That is, the bypass conduit 9, 12 does not facilitate fluid communication with a compensation chamber in the closed position of the valve.

SUMMARY

The teachings of the present disclosure may be used to design valves for heating, ventilation, and/or air conditioning installations. The valves designed in light of the presented disclosure may exhibit improved pressure control compared to previously known valves.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 1 is a schematic cross-section view of a valve incorporating teachings of the present disclosure in its open position;

FIG. 2 is a schematic cross-section view of the valve in FIG. 1 in its closed position;

FIG. 3 is a close-up detailed view of a bypass conduit incorporating teachings of the present disclosure that may be employed in various valve embodiments;

FIG. 4 is a close-up detailed view of another bypass conduit incorporating teachings of the present disclosure that may be employed in various valve embodiments, where the bypass conduit comprises more than one piece.

FIG. 5 is a close-up detailed view of an alternate bypass conduit incorporating teachings of the present disclosure; and FIG. 6 is a schematic cross-section view of another valve incorporating teachings of the present disclosure employing the alternate bypass conduit in FIG. 5.

DETAILED DESCRIPTION

Various embodiments of the present disclosure include a valve body with an inlet, an outlet, and a compensation chamber between the inlet and the outlet. A fluid path is arranged between the inlet and the outlet of the valve body. A valve member is disposed in the fluid path and can be selectively positioned to open and to close the fluid path. To that end, the valve member comprises a main conduit with a first end and with a second end. Orifices are arranged at each end of the main conduit. In the open position, the orifices of the main conduit are in fluid communication with the inlet and with the outlet. Accordingly, fluid flow from the inlet through the main conduit to the outlet is enabled in the open position. In the closed position, fluid communication between at least one of the orifices of the main conduit and both the inlet and the outlet is blocked. That is, at least one of the orifices of the main conduit is in fluid communication neither with the inlet nor with the outlet. Accordingly, fluid flow from the inlet through the main conduit to the outlet is obstructed in the closed position.

In some embodiments, the valve member also comprises a bypass conduit in fluid communication with the main conduit. In the closed position, an orifice of the bypass conduit is in fluid communication with the inlet or with the outlet. Also, the main conduit is in fluid communication with the compensation chamber. Fluid flow is thus enabled from the inlet or from the outlet through the bypass conduit to the main conduit and from the main conduit to the compensation chamber.

In some embodiments, to ease manufacture, the bypass conduit has a first portion with a first cross-section and a second portion with second cross-section. The two portions are in fluid communication with one another. The first portion comprises the orifice of the bypass conduit. The second portion is in fluid communication with the main conduit. The two cross-sections differ at least by a factor two, preferably at least by a factor four, yet more preferably at least by a factor eight. In some embodiments, the main conduit is elbow-shaped and/or L-shaped.

In some embodiments, the first cross-section is the maximum cross-section perpendicular to a prevailing direction of fluid flow through the first portion and wherein the second cross-section is the maximum cross-section perpendicular to a prevailing direction of fluid flow through the second portion. The prevailing direction of fluid flow through each portion is the direction of laminar fluid flow along the respective portion in the absence of turbulence.

In some embodiments, the valve member comprises a pivotal ball perforated by the main conduit and by the bypass conduit.

In some embodiments, a multi-way valve comprises a valve according to the instant disclosure.

Various embodiments of the instant disclosure may be part of a multi-way valve and/or of a valve assembly. In some embodiments, a plurality of the valves are arranged in a single multi-way valve. The valve 1 as shown in FIG. 1 has a valve body 2 with an inlet 3 and an outlet 4. The valve 1 is not limited to a single inlet 3 and outlet 4, and may have a plurality of inlets ports and/or a plurality of outlet ports. A fluid path extends from the inlet 3 to the outlet 4 of valve 1, when the valve 1 is in the open position as shown in FIG. 1. A valve member 5 is disposed in the fluid path. The valve member 5 depicted on FIG. 1 is ball-shaped and/or cylindrical. The valve member 5 pivots, e.g. about an axis perpendicular to the drawing plane of FIG. 1. A plunger (not shown in the figures) that extends into the valve body 2 may, by way of non-limiting example, be employed for pivotal movement of valve member 5. A plunger may then be joined to valve member 5. That plunger enables pivotal movement of valve member 5 about an axis perpendicular to the drawing plane of FIG. 1.

In some embodiments, the valve body 2 is made of a metallic material such as steel, e.g., austenitic (stainless) steel or ferrite steel. In an alternate embodiment, valve body 2 is made of aluminum (alloy) or brass or gunmetal. In some embodiments, the valve body 2 is made of a polymeric material. In some embodiments, the valve body 2 is manufactured via an additive manufacturing technique such as three-dimensional printing.

In some embodiments, the valve member 5 is made of a ceramic material. Valve member 5 may comprise engineering ceramics, e.g., aluminum oxide ($Al_2O_3$), silicon carbide (SiC), zirconium dioxide ($ZrO_2$), and/or magnesium oxide (MgO). The valve member may comprise of a ceramics material such as aluminum oxide with a suitable level of purity such as 92%, 96%, or 99%. Higher levels of purity may confer advantages in terms of mechanical stiffness and strength and/or dielectric strength.

In some embodiments, the valve member 5 is made of a metallic material such as steel, in particular austenitic (stainless) steel or ferrite steel. In some embodiments, the valve member 5 is made of aluminum (alloy) or brass or gunmetal. In some embodiments, the valve member 5 is made of a polymeric material.

Inlet conduit 3 and outlet conduit 4 (also referenced herein as "inlet 3" and "outlet 4", respectively) may be cylindrical or substantially cylindrical. That is, inlet conduit 3 and outlet conduit 4 have got circular or substantially circular cross-sections. In some embodiments, at least one of the inlet conduit 3 or the outlet conduit 4 is a bore. In some embodiments, the two conduits 3 and 4 are both bores. Inlet conduit 3 and/or outlet conduit 4 may, in alternate embodiments, have elliptical or polygonal cross-sections.

The aspect ratios of inlet conduit 3 and/or of outlet conduit 4 relate the lengths of their respective fluid paths to their minimum diameters perpendicular to their fluid paths. The aspect ratios of inlet conduit 3 and/or of outlet conduit 4 may be less than ten, less than five, or less than two. Smaller aspect values may confer advantages in terms of improved flow.

FIG. 1 shows valve 1 in its open position. Valve member 5 is oriented to enable fluid flow through main conduit 6a, 6b of the valve member 5. A fluid such as water and/or a blend thereof, e.g. a blend of water and potassium formate, and/or a combustible fluid and/or a R-401A, 404A, R-406A, R-407A, R-407C, R-408A, R-409A, R-410A, R-438A, R-500, or R-502 refrigerant thus enters valve 1 via inlet 3, then flows via main conduit 6a, 6b toward outlet 4 and leaves valve 1 via outlet 4. To that end, inlet 3, outlet 4, and main conduit 6a, 6b are in fluid communication when the valve 1 is in its open position.

In some embodiments, the main conduit 6a, 6b comprises an elbow-shaped and/or L-shaped conduit with a first portion 6a and with a second portion 6b. In some embodiments, the portions 6a and 6b are legs 6a and 6b of the main conduit of the valve member 5. First portion 6a is in fluid communication with second portion 6b. Laminar flow, in particular laminar flow in the absence of turbulence, of a fluid through portions 6a, 6b defines an axis for each portion. In some embodiments, the laminar flow through portions 6a, 6b is characterized by a Reynolds number Re<2300, in particular Re<1000 or even Re<500. The (flow) axes of portions 6a, 6b may be perpendicular where the main conduit comprising legs 6a and 6b is an L-shaped conduit or substantially perpendicular where the main conduit comprising legs 6a and 6b is an elbow-shaped conduit.

In some embodiments, the portions 6a and 6b may be cylindrical or substantially cylindrical. That is, portions 6a and 6b have got circular or substantially circular cross-sections. Portions 6a, 6b may, in other embodiments, have elliptical or polygonal cross-sections.

In order for the first portion 6a of the main conduit of the valve member 5 to be in fluid communication with inlet 3, the first portion 6a has an outer end having an orifice 7a. Also, inlet 3 has an inner end having an orifice 8 (also referenced as valve port 8 of inlet 3) pointing in the direction of valve member 5. The (opening areas of) orifices 8 of inlet 3 and 7a of first portion 6a of main conduit overlap to enable fluid communication, when valve member 5 is pivoted to where the valve 1 is in its open position. It is envisaged that (the opening areas of) orifices 8 of inlet 3 and 7a of first portion 6a overlap completely, when valve member 5 is pivoted to where the valve 1 is in its open position. In some embodiments, the opening areas of orifices 8 of inlet 3 and 7a of first portion 6a overlap to some extent, thereby enabling fluid communication in part, when valve member 5 is pivoted to where the valve 1 is in its open position. It is envisaged that a gasket such as an O-ring loops about an edge of inlet orifice 8 to inhibit leakages.

In some embodiments, at least one portion 6a, 6b is a bore. In some embodiments, the two portions 6a, 6b are both bores. In some embodiments, the main conduit 6a, 6b is an arcuate conduit extending from orifice 7a to orifice 7b. In some embodiments, the main conduit 6a, 6b is a straight conduit. Orifices 7a and 7b in this embodiment are then arranged on opposite surfaces of valve member 5. Likewise, in this embodiment, inlet conduit 3 and outlet conduit 4 are arranged at opposite ends of the valve body 2.

In order for the second portion 6b of the main conduit of the valve member 5 to be in fluid communication with outlet 4, the second portion 6b has an outer end with having an orifice 7b. Also, outlet 4 has an inner end having an orifice 9 (also referenced as valve port 9 of outlet 4) pointing in the direction of valve member 5. In some embodiments, the (opening areas of) orifices 9 of outlet 4 and 7b of second portion 6b of main conduit overlap to enable fluid communication, when valve member 5 is pivoted to where the valve 1 is in its open position. In some embodiments, the opening areas of orifices 9 of outlet 4 and 7b of second portion 6b overlap completely, when valve member 5 is pivoted to where the valve 1 is in its open position. In some embodiments, the opening areas of orifices 9 of outlet 4 and 7b of second portion 6b overlap to some extent, thereby enabling fluid communication in part, when valve member 5 is pivoted to where the valve 1 is in its open position.

In some embodiments, the first portion 6a has got a minimum cross-section area of at least 10 mm$^2$, of at least 64 mm$^2$, or at least 100 mm$^2$. Larger cross-section areas may confer advantages in terms of enhanced flow. In some embodiments, the second portion 6b has got a minimum cross-section area of at least 10 mm$^2$, of at least 64 mm$^2$, or of at least 100 mm$^2$. Portions 6a and 6b of the main conduit may have the same or similar cross-section areas. In some embodiments, the cross-section areas of portions 6a and 6b of the main conduit may differ by less than 30%, by less than 10%, or by less than 5%. In some embodiments, the portions 6a and 6b of the main conduit have fluid paths with the same or with similar lengths and/or length dimensions. The length dimensions of the fluid paths of portions 6a and 6b may differ by less than 30%, by less than 10%, or by less than 5%. The aspect ratios of portions 6a and 6b relate the lengths of their respective fluid paths to their minimum diameters perpendicular to their fluid paths. The aspect ratios of portions 6a and 6b may be less than twenty, less than ten, or less than five. Smaller aspect values may confer advantages in terms of improved flow.

Valve 1 as illustrated on FIG. 2 is in its closed position. To that end, valve member 5 is pivoted counter-clockwise by (approximately) 45° about an axis perpendicular to the drawing plane of FIG. 2. Fluid flow through inner orifice 9 of outlet 4 is blocked by a shutter portion 5a of valve member 5. Shutter portion 5a is disposed in between portions 6a and 6b of the main conduit. To obturate fluid flow through outlet 4, shutter portion 5a has a shutter surface that seals or substantially seals orifice 9 of outlet 4 when the valve member 5 is pivoted to where valve 1 is in its closed position. Shutter surface of shutter portion 5a faces or points outwards from the valve member 5 towards valve body 2 to face orifice or valve port 9. In some embodiments, a surface along a sector of shutter portion 5a abuts orifice 9 when the valve member 5 is pivoted to where valve 1 is in its closed position, thereby defining the shutter surface of the shutter portion 5a. In order for the shutter surface to effectively prevent and/or inhibit leakage from outlet conduit 4, any gap between the shutter surface and the edge of orifice 9 of the outlet conduit 4 is at most 0.58 micrometers wide, at most 0.35 micrometers wide, or at most 0.2 micrometers wide. In some embodiments, a gasket and/or an O-ring seals orifice 9 and/or outlet conduit 4 against the shutter surface of portion 5a. The gasket, in particular the O-ring, may loop about an edge of orifice 9 to inhibit leakages.

With valve 1 in its closed position, inlet conduit 3 is in fluid communication with a bypass conduit 10a, 10b via inlet orifice 8. A fluid may thus flow from inlet conduit 3 via inlet orifice 8 and bypass conduit 10a, 10b toward main conduit 6a, 6b of the valve member 5 when the valve 1 is in its closed position. To that end, bypass conduit 10a, 10b has an outer orifice 11a (shown in FIGS. 3 and 4) pointing in the direction of inlet conduit 3 when the valve 1 is in its closed position. The opening areas of orifice 8 of inlet 3 and outer orifice 11a of bypass conduit 10a, 10b overlap to enable fluid communication, when valve member 5 is pivoted to where the valve 1 is in its closed position. In some embodiments, the opening areas of orifice 8 of inlet 3 and outer orifice 11a of bypass conduit 10a, 10b overlap completely, when valve member 5 is pivoted to where the valve 1 is in its closed position.

In some embodiments, the opening areas of orifice 8 of inlet 3 and outer orifice 11a of bypass conduit 10a, 10b overlap to some extent, thereby enabling fluid communication in part, when valve member 5 is pivoted to where the valve 1 is in its closed position. In addition, bypass conduit 10a, 10b and main conduit 6a, 6b have a common orifice 11b as shown in FIGS. 3 and 4. Bypass conduit 10a, 10b and main conduit 6a, 6b are in fluid communication via their respective common orifice 11b.

As shown in FIG. 2, the bypass conduit 10a, 10b has got an outer portion 10a pointing in the direction of the valve body 2. Bypass conduit 10a, 10b also has got an inner portion 10b pointing in the direction of main conduit 6a, 6b. Outer portion 10a has the outer orifice 11a of bypass conduit 10a, 10b. Inner portion 10b has the inner orifice 11b of bypass conduit 10a, 10b as shown in FIGS. 3 and 4. Inner portion 10b of the bypass conduit can be in fluid communication with any of the portions 6a, 6b of the main conduit 6a, 6b of the valve member 5. Inner portion 10b of the bypass conduit can be in fluid communication with both portions 6a, 6b of the main conduit of the valve member 5. The two portions 10a, 10b of the bypass conduit are in fluid communication with one another. To that end, an internal bypass orifice 13 connects the portions 10a, 10b of the bypass conduit thereby enabling fluid communication.

In some embodiments, portions 10a and 10b of the bypass conduit may be cylindrical or substantially cylindrical. That is, portions 10a and 10b have got circular or substantially circular cross-sections. Portions 10a, 10b may, in other embodiments, may have elliptical or polygonal cross-sections.

In some embodiments, at least one portion 10a, 10b of the bypass conduit is a bore. In some embodiments, the two portions 10a, 10b may both be bores. In some embodiments, every portion 10a, 10b of the bypass conduit may form a straight conduit.

In some embodiments, the first portion 10a of the bypass conduit has got a minimum cross-section area of at least 4 mm$^2$, at least 2 mm$^2$, or at least 1 mm$^2$. Smaller cross-section areas may confer advantages in terms of reduced leakages. In some embodiments, the second portion 10b of the bypass conduit has got a minimum cross-section area of at least 2 mm$^2$, at least 4 mm$^2$, or of at least 8 mm$^2$. The cross-section areas of portions 10a and 10b of the bypass conduit may differ by at least a factor two, a factor four, or a factor eight.

The aspect ratios of portions 10a and 10b of the bypass conduit relate the lengths of their respective fluid paths to their minimum diameters perpendicular to their fluid paths. The aspect ratios of portions 10a and 10b may be at least five, ten, or twenty. Higher aspect ratios may confer advantages in terms of reduced leakages.

With valve 1 in its closed position, portion 6a of the main conduit is in fluid communication with a compensation chamber 19 of valve body 2 as shown in FIG. 2. In some embodiments, the compensation chamber 19 is a cavity. To enable fluid communication, orifice 7a of portion 6a overlaps with aperture 20 of intermediate chamber 19. In some embodiments, the opening areas of orifice 7a of main conduit portion 6a and aperture 20 of compensation chamber 19 overlap completely when the valve member 5 is pivoted to where the valve 1 is in its closed position. In some embodiments, the opening areas of orifice 7a of main conduit portion 6a and aperture 20 of compensation chamber 19 overlap to some extent when the valve member 5 is pivoted to where the valve 1 is in its closed position, thereby enabling fluid communication in part. In some embodiments, a gasket such as an O-ring loops about an edge of aperture 20 to inhibit leakages.

Portion 6a of the main conduit is in fluid communication with bypass conduit 10a, 10b and also in fluid communication with compensation chamber 19, when the valve member 5 is pivoted to where the valve 1 is in its closed position. Bypass conduit 10a, 10b as shown on FIG. 2 is in fluid communication with inlet conduit 3 also when the valve member 5 is pivoted to where the valve 1 is in its closed position. A fluid path is thus established from inlet conduit 3 through bypass conduit 10a, 10b and through portion 6a of the main conduit to compensation chamber 19, when the valve 1 is in its closed position. This fluid path allows compensation of changes in fluid pressure in the inlet 3, in the bypass conduit 10a, 10b, and in the main conduit 6a, 6b. Compensation chamber 19 absorbs such changes in pressure thereby mitigating the risk of mechanical failure.

In some embodiments, a compensation chamber 19 is arranged such that a fluid path can be established from outlet conduit 4 through bypass conduit 10a, 10b and through a portion 6a, 6b of the main conduit to compensation chamber 19. In some embodiments, a compressible member such as a gas-filled, compressible pouch 21 is arranged inside compensation chamber 19. Compression of the gas-filled pouch 21 reduces the volume of pouch 21. A reduction in volume of pouch 21 entails a reduction in pressure in any components 3, 6a, 6b, 10a, 10b connected to and/or in fluid communication with chamber 19.

FIG. 3 provides a close-up view of the portions 10a, 10b of the bypass conduit. The outer orifice 11a is provided by outer portion 10a and faces or points in the direction of valve body 2. The inner orifice 11b is provided by inner portion 10b of the bypass conduit.

It enables fluid communication between portions 6a, 6b of the main conduit and inner portion 10b of the bypass conduit.

In some embodiments, the portions 10a and 10b of the bypass conduit do not have fluid paths between their inlets and their outlets of same lengths and/or of same length dimensions. The fluid path through portion 10b may, by way of non-limiting example, be longer than the fluid path of portion 10a by a factor of at least two, at least five, or at least ten. In some embodiments, the portions 10a and 10b of the bypass conduit need not be concentric or coaxial. That is, the outer portion 10a can be symmetric about an axis 12a as shown in FIG. 3 whilst inner portion 10b can be symmetric about a different axis 12b. The two axes 12a and 12b need not coincide or be coaxial.

In some embodiments, the maximum diameter of outer portion 10a perpendicular to (flow) axis 12a is less than the maximum diameter of inner portion 10b perpendicular to (flow) axis 12b. The maximum diameter of outer portion 10a may be less than the maximum diameter of inner portion 10b by a factor of at least $\sqrt{2}$, a factor of at least two, or a factor of at least four. Reduced diameters of the narrower portion confer advantages in terms of reduced leakages.

In some embodiments, the portion of valve member 5 surrounding bypass conduit 5b, 5c is not made of a single piece. FIG. 4 shows two portions 5b and 5c of valve member 5. Portion 5b of the valve body comprises outer portion 10a of the bypass conduit. Portion 5c of the valve body comprises inner portion 10b of the bypass conduit.

Portion 5c of the valve body comprises a port 14. Port 14 has dimensions such that port 14 can receive outer bypass portion 5b. In some embodiments, the port 14 is a bore or a slot. In some embodiments, the bypass portion 5b is secured to or joined to port 14 via a threaded connection. In some embodiments, the outer bypass portion 5b is secured to or joined to port 14 via a welded joint or via a glued joint. In some embodiments, the outer bypass portion 5b has snap-on clips for attachment to docking members of port 14. Outer bypass portion 5b is then secured to or mounted to port 14 by snap-on action of its clips onto the docking members of port 14. In still another embodiment, a friction-locked connection is employed to secure outer bypass portion 5b to port 14.

In some embodiments, the outer bypass conduit 10a of the outer bypass portion 5b does not have a smaller cross-section than inner bypass conduit 10b of the inner bypass portion 5c of the valve member 5. FIG. 5 illustrates a bypass conduit 15a, 15b with an outer portion 15a and an inner portion 15b. The cross-section of outer bypass conduit 15a is larger than the cross-section of inner bypass conduit 15b.

Bypass conduit 15a, 15b has an outer portion 15a that has an outer orifice 18a pointing in the direction of valve body 2. Bypass conduit 15b also has an inner portion 15b that has an inner orifice 18b pointing in the direction of main conduit 6a, 6b. Inner portion 15b of the bypass conduit can be in fluid communication with any of the portions 6a, 6b of main conduit 6a, 6b. Inner portion 15b of the bypass conduit can be in fluid communication with both portions 6a, 6b of the main conduit. The two portions 15a, 15b of the bypass conduit are in fluid communication with one another. To that end, an internal bypass orifice 17 connects the portions 15a, 15b of the bypass conduit thereby enabling fluid communication.

In some embodiments, the portions 15a and 15b of the bypass conduit are cylindrical or substantially cylindrical. That is, portions 15a and 15b have got circular or substantially circular cross-sections. Portions 15a, 15b may, in alternate embodiments, have elliptical or polygonal cross-sections.

In some embodiments, the at least one portion 15a, 15b of the bypass conduit is a bore. In some embodiments, the two portions 15a, 15b are both bores. In some embodiments, every portion 15a, 15b of the bypass conduit forms a straight conduit.

In some embodiments, the second portion 15b of the bypass conduit has got a minimum cross-section area of at least 4 mm$^2$, at least 2 mm$^2$, or at least 1 mm$^2$. In some embodiments, the first portion 15a of the bypass conduit has got a minimum cross-section area of at least 2 mm$^2$, at least 4 mm$^2$, or at least 8 mm$^2$. The cross-section areas of portions 15a and 15b of the bypass conduit may differ by at least a factor two, at least a factor four, or by at least a factor eight.

The aspect ratios of portions 15a and 15b of the bypass conduit relate the lengths of their respective fluid paths to their minimum diameters perpendicular to their fluid paths. The aspect ratios of portions 15a and 15b may be at least five, at least ten, or at least twenty. Higher aspect ratios may confer advantages in terms of reduced leakages.

In some embodiments, the portions 15a and 15b of the bypass conduit do not have fluid paths between their inlets and their outlets of same lengths and/or of same length dimensions. The fluid path through portion 15a may, by way of non-limiting example, be longer than the fluid path of portion 15b by a factor of at least two, by a factor of at least five, or by a factor of at least ten.

In some embodiments, the portions 15a and 15b of the bypass conduit are not concentric or coaxial. That is, the outer portion 15a can be symmetric about an axis 16a whilst inner portion 15b can be symmetric about a different axis 16b. The two axes 16a and 16b need not coincide or be coaxial. In some embodiments, the maximum diameter of outer portion 15a perpendicular to (flow) axis 16a is larger than the maximum diameter of inner portion 15b perpendicular to (flow) axis 16b. The maximum diameter of outer portion 15a preferably is larger than the maximum diameter of inner portion 15b by a factor of at least $\sqrt{2}$, at least two, or by a factor of at least four.

As shown in FIG. 4, bypass conduit 10a, 10b can be made up of separable portions 5b, 5c. One of ordinary skill in the art having reviewed the present disclosure would understand that bypass conduit 15a, 15b as shown on FIG. 5 can similarly be made up of separable portions.

A valve 1 in its open position with a bypass conduit 15a, 15b is shown on FIG. 6. The outer portion 15a of the bypass conduit shown on FIG. 6 has a larger cross-section than the inner portion 15b of the same bypass conduit. The outer portion 15a of the bypass conduit shown on FIG. 6 also has a larger maximum diameter than the inner portion 15b of the same bypass conduit.

As described in detail herein, the instant disclosure teaches a valve 1. The valve 1 comprises:

a valve body 2 having an inlet 3, an outlet 4, and a fluid path extending between the inlet 3 and the outlet 4 (when the valve 1 is in an open position);

the valve 1 further comprises a valve member 5 situated in the fluid path between the inlet 3 and the outlet 4;

the valve member 5 being selectively movable between a closed position, which closes the fluid path between the inlet 3 and the outlet 4, and an open position, which opens the fluid path between the inlet 3 and the outlet 4;

the valve member 5 comprises a first orifice 7a and a second orifice 7b and a main conduit 6a, 6b extending between the first orifice 7a and the second orifice 7b;

the valve member 5 further comprises a bypass conduit 10a, 10b; 15a, 15b in fluid communication with the main conduit 6a, 6b;

the bypass conduit 10a, 10b; 15a, 15b comprising a first portion 10a; 15a with a first cross-section area and a second portion 10b; 15b with a second cross-section area that is different from the first cross-section area, the first portion 10a; 15a being in fluid communication with the second portion 10b; 15b; and wherein the first cross-section area is different from the second cross-section area.

The instant disclosure also teaches a valve 1 comprising:

a valve body 2 having an inlet 3, an outlet 4, and a fluid path extending between the inlet 3 and the outlet 4;

the valve 1 further comprises a valve member 5 situated in the fluid path between the inlet 3 and the outlet 4;

the valve member 5 being selectively movable between a closed position, which closes the fluid path between the inlet 3 and the outlet 4, and an open position, which opens the fluid path between the inlet 3 and the outlet 4;

the valve member 5 comprising a first orifice 7a and a second orifice 7b and a main conduit 6a, 6b extending between the first orifice 7a and the second orifice 7b;

the valve member 5 further comprising a bypass conduit 10a, 10b; 15a, 15b in fluid communication with the main conduit 6a, 6b;

the bypass conduit 10a, 10b; 15a, 15b comprising a first portion 10a; 15a with a first cross-section area and a second portion 10b; 15b with a second cross-section area that is different from the first cross-section area, the first portion 10a; 15a being in fluid communication with the second portion 10b; 15b;

wherein the valve body 2 comprises a compensation chamber 19;

wherein the compensation chamber 19 comprises a compensation orifice 20;

wherein the bypass conduit 10a, 10b; 15a, 15b comprises an outer bypass orifice 11a; 18a defined by and disposed on the outer surface of the valve member 5;

wherein the valve member 5 comprises an internal orifice 11b; 18b situated between the bypass conduit 10a, 10b; 15a, 15b and the main conduit 6a, 6b; and wherein, in the closed position, the inlet 3 is in fluid communication with the compensation chamber 19 via the outer bypass orifice 11a; 18a, via the bypass conduit 10a, 10b; 15a, 15b, via the internal orifice 11b; 18b of the valve member 5, via the main conduit 6a, 6b, via the first orifice 7a, and via the compensation orifice 20.

In some embodiments, the valve member 5 comprises a pivotal valve member 5, e.g. a valve member 5 pivotal about an axis of the valve member 5. In some embodiments, the valve comprises a stem anchored to the valve member 5 such that the stem is configured to pivot the valve member 5. In some embodiments, the stem is configured to pivot the valve member 5 about an axis of the valve member 5. In some embodiments, the stem defines or substantially defines the axis of the valve member 5.

In some embodiments, the first cross-section area is at least twice as large as the second-cross section area, or that the second cross-section area is at least twice as large as the first cross-section area. In some embodiments, the first cross-section area is at least five times as large as the second-cross section area, or the second cross-section area is at least five times as large as the first cross-section area. In some embodiments, the first cross-section area is at least ten times as large as the second-cross section area, or the second cross-section area is at least ten times as large as the first cross-section area.

The instant disclosure also teaches any of the aforementioned valves, wherein the first portion 10a; 15a defines a first longitudinal axis 12a; 16a and a first cross-section perpendicular to the first longitudinal axis 12a; 16a; wherein the second portion 10b; 15b defines a second longitudinal axis 12b; 16b and a second cross-section perpendicular to the second longitudinal axis 12b; 16b; and wherein the first cross-section area is an area of the first cross-section and the second cross-section area is an area of the second cross-section. The first cross-section area may be parallel to the second cross-section area. The first cross-section may be parallel to the second cross-section. The first cross-section area may be a maximum area of the first cross-section. The second cross-section area may be a maximum area of the second cross-section.

In some embodiments, the first longitudinal axis 12a; 16a; is parallel to the second longitudinal axis 12b; 16b. In this particular embodiment, the first longitudinal axis 12a; 16a and the second longitudinal axis 12b; 16b are not coaxial. That is, the first longitudinal axis 12a; 16a does not intersect the second longitudinal axis 12b; 16b.

The instant disclosure also teaches any of the aforementioned valves, wherein the first portion 10a; 15a has a first diameter dimension perpendicular to the first longitudinal axis 12a; 16a and a first length dimension parallel to the first longitudinal axis 12a; 16a; wherein the first length dimension is at least twice as large as the first diameter dimension; wherein the second portion 10b; 15b has a second diameter dimension perpendicular to the second longitudinal axis 12b; 16b and a second length dimension parallel to the second longitudinal axis 12b; 16b; and wherein the second length dimension is at least twice as large as the second diameter dimension.

In some embodiments, the first length dimension of the first portion 10a; 15a is different from the second length dimension of the second portion 10b; 15b. In some embodiments, the first diameter dimension of the first portion 10a; 15a is different from the second diameter dimension of the second portion 10b; 15b. The first diameter dimension may be the maximum diameter dimension of the first portion 10a; 15a perpendicular to the first longitudinal axis 12a; 16a. The second diameter dimension may be the maximum diameter dimension of the second portion 10b; 15b perpendicular to the second longitudinal axis 12b; 16b.

In some embodiments, the first portion 10a; 15a has got two opposite ends and the first length dimension extends between the opposite ends of the first portion 10a; 15a and the second portion 10b; 15b has got two opposite ends and the second length dimension extends between the opposite ends of the second portion 10b; 15b.

The instant disclosure also teaches any of the aforementioned valves, wherein the bypass conduit 10a, 10b; 15a, 15b comprises an internal orifice 13; 17 situated between the first portion 10a; 15a and the second portion 10b; 15b; and wherein the first portion 10a; 15a is in fluid communication with the second portion 10b; 15b via the internal orifice 13; 17 of the bypass conduit 10a, 10b; 15a, 15b.

The instant disclosure also teaches any of the aforementioned valves, wherein the valve member 5 comprises an outer surface; wherein the first orifice 7a of the main conduit 6a, 6b and the second orifice 7b of the main conduit 6a, 6b are (defined by and) situated on the outer surface of the valve member 5; wherein, when the valve 1 is in the open position, the main conduit 6a, 6b is in fluid communication with the inlet 3 via the first orifice 7a; and wherein, when the valve 1 is in the open position, the main conduit 6a, 6b is in fluid communication with the outlet 4 via the second orifice 7b such that the fluid path between the inlet 3 and the outlet 4 is open.

In some embodiments, the outer surface envelopes valve member 5 and/or faces the valve body 2, and/or points in the direction of the valve body 2. In some embodiments, the first orifice 7a and the second orifice 7b point in the direction of the valve body 2. In some embodiments, the first orifice 7a and the second orifice 7b face the valve body 2.

The instant disclosure also teaches any of the aforementioned valves, wherein the outer surface of the valve member 5 comprises a shutter surface; wherein, in the closed position, the shutter surface faces at least one valve port, the at least one port being selected from the inlet 3 or the outlet 4 such that the shutter surface obstructs fluid flow into and out of the at least one valve port and such that the fluid path between the inlet 3 and the outlet 4 is closed.

In some embodiments, the valve 1 comprises at least one valve port selected from the inlet 3 or the outlet 4. The main conduit 6a, 6b ideally comprises a first leg 6a and a second leg 6b, the first leg 6a being in fluid communication with the second leg 6b. The first leg 6a defines a first leg axis and the second leg 6b defines a second leg axis. In some embodiments, the first leg axis and the second leg axis form an obtuse or an acute angle of less than 180°, in particular of less than 120° or of less than 100° such as 90° or substantially 90°. The shutter surface may be disposed on an outer surface of a shutter portion 5a, wherein the obtuse or the acute angle points in the direction of the shutter portion 5a. In an embodiment, the shutter surface is an arcuate shutter surface.

In some embodiments, the in the closed position the shutter surface faces at least one valve port, the at least one port being selected from the inlet 3 or the outlet 4 such that the shutter surface obturates fluid flow into and out of the at least one valve port and the fluid path between the inlet 3 and the outlet 4 is closed.

The instant disclosure also teaches any of the aforementioned valves, wherein the bypass conduit 10a, 10b; 15a, 15b comprises an outer bypass orifice 11a; 18a (defined by and) disposed on the outer surface of the valve member 5; wherein, in the closed position, the bypass conduit 10a, 10b; 15a, 15b is in fluid communication with the inlet 3 via the outer bypass orifice 11a; 18a; and wherein the main conduit 6a, 6b is in fluid communication with the bypass conduit 10a, 10b; 15a, 15b. The outer bypass orifice 11a; 18a may point in the direction of the valve body 2.

The instant disclosure also teaches any of the aforementioned valves, wherein the valve member 5 comprises an internal orifice 11b; 18b situated between the bypass conduit 10a, 10b; 15a, 15b and the main conduit 6a, 6b; and wherein the bypass conduit 10a, 10b; 15a, 15b is in fluid communication with the main conduit 6a, 6b via the internal orifice 11b; 18b of the valve member 5. In some embodiments, the second portion 10b; 15b comprises the internal orifice 11b; 18b of the valve member 5. The main conduit 6a, 6b ideally also comprises the internal orifice 11b; 18b of the valve member 5. The second portion 10b; 15b ideally is in fluid communication with the main conduit 6a, 6b.

The instant disclosure also teaches any of the aforementioned valves, wherein the first portion 10a; 15a of the bypass conduit 10a, 10b; 15a, 15b is in fluid communication with the outer bypass orifice 11a; 18a; and wherein the second portion 10b; 15b of the bypass conduit 10a, 10b; 15a, 15b is in fluid communication with the internal orifice 11b; 18b of the valve member 5.

The instant disclosure also teaches any of the aforementioned valves, wherein the valve body 2 comprises a compensation chamber 19 disposed in between the inlet 3 and the outlet 4. In some embodiments, the compensation chamber 19 is a compensation cavity 19.

The instant disclosure also teaches any of the aforementioned valves, wherein the compensation chamber 19 comprises a compensation orifice 20; wherein, in the closed position, the first orifice 7a of the main conduit 6a, 6b faces the compensation orifice 20; and wherein, in the closed position, the compensation chamber 19 is in fluid communication with the main conduit 6a, 6b via the compensation orifice 20 and via the first orifice 7a of the main conduit 6a, 6b.

The instant disclosure also teaches any of the aforementioned valves, wherein, in the closed position, the inlet 3 is in fluid communication with the compensation chamber 19 via the outer bypass orifice 11a; 18a, via the bypass conduit 10a, 10b; 15a, 15b, via the internal orifice 11b; 18b of the valve member 5, via the main conduit 6a, 6b, via the first orifice 7a, and via the compensation orifice 20.

The instant disclosure also teaches any of the aforementioned valves, wherein the compensation chamber 19 comprises a compressible member 21; and wherein the compressible member 21 is configured to shrink in response to an increase in fluid pressure inside compensation chamber 19. In some embodiments, the compressible member 21 is a pouch.

The instant disclosure also teaches any of the aforementioned valves, wherein the inlet 3 comprises an inlet orifice 8 facing the valve member 5; and wherein the outlet 4 comprises an outlet orifice 9 facing the valve member 5. In some embodiments, the inlet orifice 8 points in the direction of and/or faces the valve member 5. In an embodiment, the inlet 3 is or comprises an inlet conduit 3. In an embodiment, the inlet 3 is or comprises an inlet port 3. In some embodiments, the outlet orifice 9 points in the direction of and/or faces the valve member 5. In some embodiments, the outlet 4 is or comprises an outlet conduit 4. In an embodiment, the outlet 4 is or comprises an outlet port 4.

The instant disclosure also teaches a multi-way valve comprising at least one valve 1 according to any of the instant disclosure. Any steps of a method for controlling a valve according to the present disclosure may be embodied in hardware, in a software module executed by a processor, in a software module executed by a processor using operating-system-virtualization, in a cloud computing arrangement, or in a combination thereof. The software may include a firmware, a hardware driver run in the operating system, or an application program. Thus, the disclosure also relates to a computer program product for performing the operations presented herein. If implemented in software, the functions described may be stored as one or more instructions on a computer-readable medium. Some examples of storage media that may be used include random access memory (RAM), read only memory (ROM), flash memory, EPROM memory, EEPROM memory, registers, a hard disk, a removable disk, other optical disks, or any available media that can be accessed by a computer or any other IT equipment and appliance.

It should be understood that the foregoing relates only to certain embodiments of the disclosure and that numerous changes may be made therein without departing from the scope of the disclosure as defined by the following claims. It should also be understood that the disclosure is not restricted to the illustrated embodiments and that various modifications can be made within the scope of the following claims.

REFERENCE NUMERALS 1 valve
2 valve body
3 inlet conduit
4 outlet conduit
5 valve member
5a shutter portion of valve member 5
5b outer bypass portion of valve member 5
5c inner bypass portion of valve member 5
6a, 6b main conduit
7a, 7b orifices of main conduit 6a, 6b
8 inner orifice of inlet conduit 3
9 outer orifice of outlet conduit 4
10a, 10b bypass conduit
11a, 11b orifices of bypass conduit 10a, 10b
12a, 12b axes of portions 10a, 10b
13 orifice between portions 10a, 10b
14 port
15a, 15b bypass conduit
16a, 16b axes of portions 15a, 15b
17 orifice between portions 15a, 15b
18a, 18b orifices of bypass conduit 15a, 15b
19 compensation chamber
20 aperture of compensation chamber 19
21 compressible member

The invention claimed is:

1. A valve comprising:
a valve body having an inlet, an outlet, and a fluid path extending between the inlet and the outlet;
a valve member situated in the fluid path between the inlet and the outlet;
the valve member movable between a closed position, closing the fluid path between the inlet and the outlet, and an open position, allowing flow along the fluid path between the inlet and the outlet;
the valve member comprising a first orifice, a second orifice, and a main conduit extending between the first orifice and the second orifice;
the valve member further comprising a bypass conduit in fluid communication with the main conduit;
the bypass conduit comprising a first portion with a first cross-section area and a second portion with a second cross-section area different from the first cross-section area, the first portion in fluid communication with the second portion;
wherein the valve body comprises a compensation chamber having a compensation orifice;
wherein the bypass conduit comprises an outer bypass orifice defined by and disposed on the outer surface of the valve member;
wherein the valve member comprises an internal orifice situated between the bypass conduit and the main conduit; and
wherein, in the closed position, the inlet is in fluid communication with the compensation chamber via the outer bypass orifice, the bypass conduit, the internal orifice of the valve member, the main conduit, the first orifice, and the compensation orifice.

2. The valve according to claim 1, wherein:
the first portion defines a first longitudinal axis and the first cross-section is defined perpendicular to the first longitudinal axis;
the second portion defines a second longitudinal axis and the second cross-section is defined perpendicular to the second longitudinal axis.

3. The valve according to claim 2, wherein:
the first portion has a first diameter dimension perpendicular to the first longitudinal axis and a first length dimension parallel to the first longitudinal axis;
the first length dimension is at least twice as large as the first diameter dimension;
the second portion has a second diameter dimension perpendicular to the second longitudinal axis and a second length dimension parallel to the second longitudinal axis; and the second length dimension is at least twice as large as the second diameter dimension.

4. The valve according to claim 1, wherein:
the bypass conduit comprises an internal orifice situated between the first portion and the second portion; and
the first portion is in fluid communication with the second portion via the internal orifice of the bypass conduit.

5. The valve according to claim 1, wherein:
the valve member comprises an outer surface;
the first orifice of the main conduit and the second orifice of the main conduit are defined by and situated on the outer surface of the valve member;
in the open position, the main conduit is in fluid communication with the inlet via the first orifice; and
the main conduit is in fluid communication with the outlet via the second orifice such that the fluid path between the inlet and the outlet is open.

6. The valve according to claim 5, wherein the outer surface of the valve member comprises a shutter surface and, in the closed position, the shutter surface faces and obstructs fluid flow into at least one of the inlet or the outlet.

7. The valve according to claim 5, wherein:
in the closed position, the bypass conduit is in fluid communication with the inlet via the outer bypass orifice; and
the main conduit is in fluid communication with the bypass conduit.

8. The valve according to claim 1, wherein:
the bypass conduit is in fluid communication with the main conduit via the internal orifice of the valve member.

9. The valve according to claim 8, wherein:
the first portion of the bypass conduit is in fluid communication with the outer bypass orifice; and
the second portion of the bypass conduit is in fluid communication with the internal orifice of the valve member.

10. The valve according to claim 1, wherein:
in the closed position, the first orifice of the main conduit faces the compensation orifice; and
in the closed position, the compensation chamber is in fluid communication with the main conduit via the compensation orifice and via the first orifice of the main conduit.

11. The valve according to claim 8, wherein:
the compensation chamber comprises a compressible member; and
the compressible member shrinks in response to an increase in fluid pressure inside compensation chamber.

12. The valve according to claim 1, wherein:
the inlet comprises an inlet orifice facing the valve member; and
the outlet comprises an outlet orifice facing the valve member.

* * * * *